United States Patent Office 3,415,885
Patented Dec. 10, 1968

3,415,885
OXIDATION PROCESS
George Wallace Hooper, Norton-on-Tees, England, assignor to Imperial Chemical Industries Limited, London, England, a corporation of Great Britain
No Drawing. Continuation-in-part of application Ser. No. 288,455, June 17, 1963. This application Jan. 26, 1966, Ser. No. 523,024
Claims priority, application Great Britain, Feb. 3, 1965, 4,686/65
8 Claims. (Cl. 260—603)

ABSTRACT OF THE DISCLOSURE

There is provided a process for the oxidation of compounds having a grouping

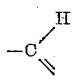

to form the corresponding compounds having the grouping

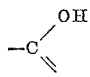

wherein the compounds to be oxidized are reacted with oxygen in the presence in hydrogen, transition metal ions such iron ions, an aliphatic alcohol, a solid catalyst of Groups Ib and VIII. The reaction is carried out at up to 30° C. and with a partial pressure of hydrogen of at least 2 atmospheres.

---

This is a continuation-in-part of application SN 288,455, filed June 17, 1963.

This invention relates to the oxidation of unsaturated organic compounds with oxygen.

In our co-pending British patent application No. 42,509/64, now British Patent No. 1,041,046 we have described a process for the oxidation of an aromatic, cycloaliphatic or olefinic hydrocarbon to give a phenol, an alcohol or a glycol respectively wherein the hydrocarbon is treated with a crude hydrogen peroxide solution. This process is facilitated by the presence in the reaction mixture of transition metal ions and, where the compound to be oxidised is a cycloaliphatic hydrocarbon, of an organic oxygen-containing compound particularly a ketone.

We have now found that the process for the oxidation of organic compounds containing the grouping

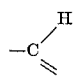

is greatly improved by the presence in the reaction mixture of an aliphatic alcohol.

According to the present invention we provide a process for the oxidation of a compound containing the grouping

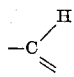

to a corresponding compound containing the grouping

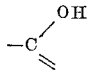

which comprises contacting it with oxygen in the presence of hydrogen, transition metal ions, an aliphatic alcohol, a solid catalyst comprising at least one element from group Ib or VIII of the Periodic Table as metal component and a carrier, and liquid water.

The starting compounds containing the grouping

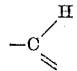

may be unsubstituted or substituted unsaturated aliphatic hydrocarbons but are preferably unsubstituted or substituted aromatic and aromatic heterocyclic compounds. The substituent groups are preferably ones which are not oxidised at an appreciable rate during the process of the invention such as for example carboxylic acid, carbonyl, hydroxyl and difficultly replaceable halogen groups. Examples of starting compounds are benzene, toluene, naphthalene, pyridene and benzoic acid.

The transition metal is for example manganese, titanium, vanadium, chromium, copper, molybdenum or preferably an iron group metal i.e. iron, cobalt or nickel. The ions are preferably introduced into the reaction mixture by adding the transition metal as one of its soluble salts. Preferably the transition metal is added in a valency state wherein it is capable of oxidation to a higher valency state.

The aliphatic alcohol used in the process of the invention preferably has up to 6 carbon atoms per hydroxyl group: methanol is particularly suitable. The proportion of alcohol to water used is preferably more than 20:80 and is especially from 40:60 to 90:10 by volume.

The solid catalyst used is preferably a catalyst capable of catalysing the combination of hydrogen with oxygen to give hydrogen peroxide. Particularly suitable catalysts are those defined in our co-pending British patent application No. 23,930/62 corresponding to my United States patent application Ser. No. 288,455 of which the present application is a continuation-in-part: especially catalysts wherein the metal component is palladium.

The process of the invention is preferably carried out in the presence of an acid. This acid is preferably at least as strong as acetic acid, particularly suitable acids being inorganic oxyacids such as, for example sulphuric acid, nitric acid, phosphoric acid and sulphonic acids or mixtures thereof. The aid concentration is preferably in the range 0.01 N to 2 N.

The partial pressure of hydrogen at which the process is carried out is conveniently greater than 2 ats. and is preferably greater than 10 ats. The temperature is conveniently in the range of 0-30° C. Preferably the amount of hydrogen present is in excess of the amount of oxygen present i.e. the partial pressure of hydrogen at the inlet of the reaction vessel is greater than the partial pressure of oxygen. The hydrogen and oxygen may be diluted with an inert gas in order to decrease the risk of an accidental explosion.

The reaction is believed to be initiated by hydroxyl radicals formed as described in our co-pending British patent application No. 23,930/62. However it is possible that the reaction is carried on by oxidation of the compound with oxygen on the surface of the solid catalyst by a mechanism similar to that described by J. N. Baxendale and J. Magee in Disc. Farad. Soc. No. 14 (1953), 160.

When methanol is used as the aliphatic alcohol it is also oxidised under the prevailing reaction conditions to formaldehyde. One embodiment of the invention comprises the simultaneous oxidation of the group —CH= and methanol to —COH= and formaldehyde by contacting with oxygen in the presence of hydrogen, transition metal ions, a solid catalyst comprising at least one element from Group Ib or VIII of the Periodic Table as metal components and a carrier, and liquid water. The group —CH= is preferably contained in an aromatic nucleus for example a phenyl nucleus and in an important embodiment of the invention is contained in benzene so as to give phenol. Phenol/formaldehyde mixtures formed by the process of the above embodiment may be separated into their component parts or may be used directly for the formation of phenol/formaldehyde resins.

The process of the invention is illustrated by the following examples.

Example 1

(a) 20 mg. of ferrous sulphate heptahydate were dissolved in 20 ml. of a solution containing methanol in the proportions indicated below and being N/10 in $H_2SO_4$. The resulting solution was placed in a 300 ml. glass-lined stirring autoclave together with 2 ml. of benzene. 0.2 gm. of a 5% palladium on silica catalyst were added and kept in suspension in the reaction mixture by vigorous stirring. This mixture was then contacted at a temperature of 20° C. with a gaseous mixture of hydrogen, oxygen and nitrogen whose partial pressures were 200 p.s.i., 100 p.s.i. and 1700 p.s.i. respectively. After 40 mins. reaction the yields were as shown in the table.

| Percent methanol in reaction mixture | Yield of phenol (mg.) | Yield of formaldehyde (mg.) |
|---|---|---|
| 0 | 27 | 0 |
| 25 | 7 | 41 |
| 50 | 11 | 50 |
| 75 | 46 | 62 |
| 95 | 31 | 59 |

Example 2

This was carried out in the same apparatus and under the same conditions as Example 1 but with the methanol replaced (a) by 75% ethanol and (b) by 75% butanol. After 40 mins. the yields of phenol were 41.3 mg. and 15 mg. respectively.

Example 3

This was carried out in the same apparatus and under the same conditions as Example 1 using 75% methanol but with the benzene replaced with other organic substrates.

After 40 mins. the yields were as shown in the table.

| Organic substrates | Product | Yield (mg.) |
|---|---|---|
| Toluene | o-Cresol | 4.2 |
|  | m-Cresol | 4.5 |
| p-Xylene | Xylenols | ca. 0.1– |
| Benzoic acid | Hydroxybenzoic acids | 22 |
| Naphthalene | Naphthols | ca. 0.5 |

Example 4

This was carried out in the same apparatus and under the same conditions as Example 1 using 75% methanol but with variable concentrations of sulphuric acid.

After 40 mins. reaction the yields were as shown in the table.

| Concentration $H_2SO_4$ | Yield of phenol (mg.) | Yield of formaldehyde (mg.) |
|---|---|---|
| 0 | 38.5 | 75.5 |
| N/20 | 41.5 | 65 |
| N/10 | 46.5 | 63.5 |
| N/5 | 45.5 | 42.5 |

I claim:
1. A process for the oxidation of a compound containing the grouping

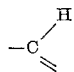

and selected from the group consisting of benzene, benzoic acid and toluene to a corresponding compound containing the grouping

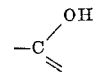

which comprises reacting the said benzene, benzoic acid or toluene with oxygen in the presence of hydrogen, transition metal ions, an unsubstituted alkanol having at most 6 carbon atoms per hydroxyl group, a solid catalyst consisting essentially of at least one element selected from the class consisting of elements from Groups Ib and VIII of the Periodic Table as metal component and a carrier, and liquid water, the reaction being carried out at a temperature of 0° to 30° C. and with a partial pressure of hydrogen of at least 2 atmospheres.

2. A process according to claim 1 wherein the transition metal is selected from the class consisting of iron, cobalt and nickel.

3. A process according to claim 1 wherein the aliphatic alcohol is methanol.

4. A process according to claim 1 wherein the proportion of the aliphatic alcohol to water is between 40:60 and 90:10 by volume.

5. A process according to claim 1 wherein the metal component of the solid catalyst is palladium.

6. A process according to claim 1 wherein there is present an acid at least as strong as acetic acid.

7. A process according to claim 6 wherein the acid is an inorganic oxyacid and is present at a concentration within the range 0.01 N to 2 N.

8. A process according to claim 1 wherein the compound containing the grouping

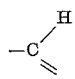

is benzene and the aliphatic alcohol is methanol, both the benzene and the methanol being oxidised to produce a phenol/formaldehyde mixture.

References Cited

FOREIGN PATENTS 1,366,253  6/1964  France.

OTHER REFERENCES

Smith et al.: Chem. Soc. Jour., pp. 2897–2905 (1963).

LEON ZITVER, *Primary Examiner.*

H. ROBERTS, *Assistant Examiner.*

U.S. Cl. X.R.

260–621, 632, 600, 297, 521.